(12) United States Patent
Yoshida (10) Patent No.: US 12,093,734 B2
(45) Date of Patent: Sep. 17, 2024

(54) OPERATION MANAGEMENT APPARATUS, METHOD, AND NON-TRANSITORY COMPUTER READABLE MEDIUM

(71) Applicant: NEC CORPORATION, Tokyo (JP)

(72) Inventor: Koichi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 867 days.

(21) Appl. No.: 17/043,374

(22) PCT Filed: Sep. 6, 2018

(86) PCT No.: PCT/JP2018/032971
§ 371 (c)(1),
(2) Date: Sep. 29, 2020

(87) PCT Pub. No.: WO2019/187209
PCT Pub. Date: Oct. 3, 2019

(65) Prior Publication Data
US 2021/0026699 A1 Jan. 28, 2021

(30) Foreign Application Priority Data
Mar. 30, 2018 (JP) ................................. 2018-067079

(51) Int. Cl.
*G06F 9/46* (2006.01)
*G06F 9/50* (2006.01)
(Continued)

(52) U.S. Cl.
CPC ........ *G06F 9/5027* (2013.01); *G06F 16/2379* (2019.01); *G06F 16/24558* (2019.01)

(58) Field of Classification Search
CPC ............. G06F 9/5027; G06F 16/24558; G06F 16/2379
See application file for complete search history.

(56) References Cited

U.S. PATENT DOCUMENTS 9,992,064 B1\* 6/2018 Chawla ................. H04L 41/082
10,263,841 B1\* 4/2019 Stamatakis ............. H04W 4/70
(Continued)

FOREIGN PATENT DOCUMENTS

| JP | H08-178270 A | 7/1996 |
| JP | 2005-122959 A | 5/2005 |

(Continued)

OTHER PUBLICATIONS

International Search Report for PCT/JP2018/032971 dated for Dec. 11, 2018.
(Continued)

*Primary Examiner* — Tammy E Lee
(74) *Attorney, Agent, or Firm* — Sughrue Mion, PLLC (57) ABSTRACT

An object is to provide an operation management apparatus, a method, and a program capable of automatically repairing a system. An operation management apparatus according to the present disclosure includes an acquisition unit configured to acquire an operation setting value S from a system and acquire an expected value E from a design information database storing design information of the system, the operation setting value S being a setting value for operating the system, the expected value E being a setting value that is obtained when the system is normally operated, and an updating unit configured to update, when the operation setting value S does not match the expected value E, the operation setting value S to the expected value E.

5 Claims, 4 Drawing Sheets

(51) Int. Cl.
*G06F 16/23* (2019.01)
*G06F 16/2455* (2019.01)

(56) References Cited

U.S. PATENT DOCUMENTS

2018/0101395 A1* 4/2018 Aleksandrov ......... G06F 9/5077
2019/0228156 A1* 7/2019 Thumati ................ G06F 21/57

FOREIGN PATENT DOCUMENTS

| JP | 2008-225995 A | 9/2008 |
| JP | 2015-118440 A | 6/2015 |
| JP | 2016-103179 A | 6/2016 |
| WO | 2012/124077 A1 | 9/2012 |
| WO | 2014/115282 A1 | 7/2014 |

OTHER PUBLICATIONS

Japanese Office Action for JP Application No. 2020-508951 mailed on Jan. 11, 2022 with English Translation.

* cited by examiner

OPERATION MANAGEMENT APPARATUS, METHOD, AND NON-TRANSITORY COMPUTER READABLE MEDIUM

This is a National Stage of International Application No. of Application No. PCT/JP2018/032971 filed Sep. 6, 2018, claiming priority to Japanese Patent Application 2018-067079 filed Mar. 30, 2018, the contents of all of which are incorporated herein by reference in their entirety.

TECHNICAL FIELD

The present disclosure relates to an operation management apparatus, a method, and a program. In particular, the present disclosure relates to an operation management apparatus, a method, and a program capable of automatically repairing a system.

BACKGROUND ART

As a database for managing information about the configuration of an IT (Information Technology) system, a CMDB (Configuration Management Database) has been known. DevOps (Development & Operations), in which cooperation between developments and operations is regarded as important, are attracting attention as one of the methods for developing and operating systems using the CMDB or the like. It is possible to develop a system according to a request from a user through connections and cooperation between developments and operations. In such a system, when an operation setting value of the system does not match its expected value, an operator of the system searches an operation manual in order to correct the un-matched operation setting value, and manually updates and corrects the un-matched operation setting value to the expected value in accordance with the operation manual. Therefore, there has been a problem that it is difficult to automatically repair the system.

Patent Literature 1 discloses a monitoring apparatus that holds a workflow definition, which is a procedure for fixing a failure that occurs in an apparatus, monitors the failure occurring in the apparatus, holds information about the failure acquired by the monitoring and a restoring procedure that has been performed for fixing the failure as history information, and updates the workflow definition based on the held history information. Patent Literature 1 does not disclose anything about the feature that when an operation setting value does not match its expected value, the un-matched operation setting value is updated and corrected to the expected value.

CITATION LIST

Patent Literature

Patent Literature 1: Japanese Unexamined Patent Application Publication No. 2015-118440

SUMMARY OF INVENTION

Technical Problem

As described above, there has been a problem that it is difficult to automatically repair a system.

An object of the present disclosure is to provide an operation management apparatus, a method, and a program for solving at least one of the above-described problems.

Solution to Problem

An operation management apparatus according to the present disclosure includes:

an acquisition unit configured to acquire an operation setting value from a system and acquire an expected value from a design information database storing design information of the system, the operation setting value being a setting value for operating the system, the expected value being a setting value that is obtained when the system is normally operated; and an updating unit configured to update, when the operation setting value does not match the expected value, the operation setting value to the expected value.

A method according to the present disclosure includes:

acquiring an operation setting value from a system and acquiring an expected value from a design information database storing design information of the system, the operation setting value being a setting value for operating the system, the expected value being a setting value that is obtained when the system is normally operated; and updating, when the operation setting value does not match the expected value, the operation setting value to the expected value.

A program according to the present disclosure causes a computer to perform:

acquire an operation setting value from a system and acquire an expected value from a design information database storing design information of the system, the operation setting value being a setting value for operating the system, the expected value being a setting value that is obtained when the system is normally operated; and update, when the operation setting value does not match the expected value, the operation setting value to the expected value.

Advantageous Effects of Invention

According to the present disclosure, it is possible to provide an operation management apparatus, a method, and a program capable of automatically repairing a system.

DESCRIPTION OF EMBODIMENTS

Example embodiments according to the present invention will be described hereinafter with reference to the drawings. The same or corresponding elements are denoted by the same symbols throughout the drawings, and redundant explanations are omitted as appropriate for the sake of clarity.

Example Embodiment

Firstly, an overview of an operation management apparatus according to an example embodiment will be described.

Figure 1:
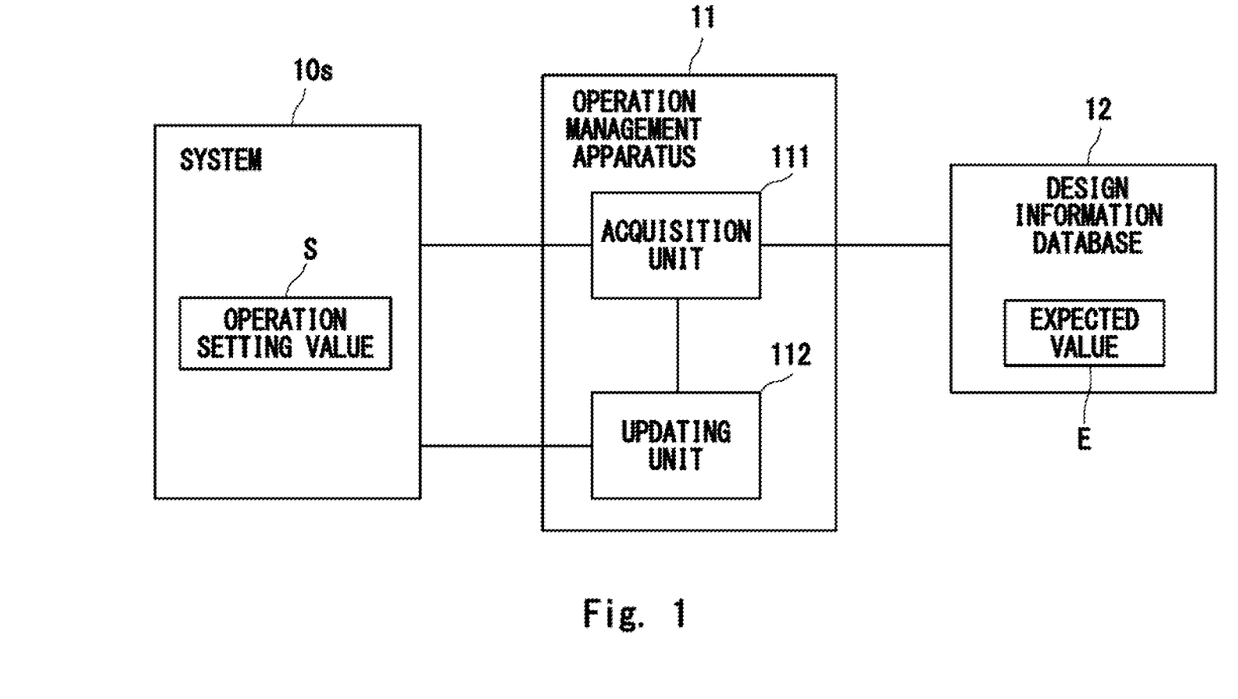
FIG. 1 is a block diagram showing an example of an operation management apparatus according to an example embodiment.

FIG. 1 is a block diagram showing an example of an operation management apparatus according to an example embodiment.

As shown in FIG. 1, an operation management apparatus 11 includes an acquisition unit 111 and an updating unit 112. A system 10s sends an operation setting value S, which is a setting value for operating the system 10s, to the operation management apparatus 11 in response to a request from the operation management apparatus 11. Information about the design of the system 10s is stored in a design information database 12. The design information database 12 selects an expected value E, which is a setting value that is obtained when the system 10s is normally operated, from the design information of the system 10s and sends the selected expected value E to the operation management apparatus 11 in response to a request from the operation management apparatus 11.

Note that the operation setting value is also referred to as an operation parameter. Further, the system may also be referred to as a commercial system.

The acquisition unit 111 of the operation management apparatus 11 acquires the operation setting value S, which is a setting value for operating the system 10s, from the system 10s. Further, the acquisition unit 111 acquires the expected value E, which is a setting value that is obtained when the system 10s is normally operated, from the design information database 12 in which the design information of the system 10s is stored.

If the system 10s is normally operated, the operation setting value S matches the expected value E. When the operation setting value S deviates from the expected value E and hence the operation setting value S does not match the expected value E, the updating unit 112 updates the operation setting value S to the expected value E. That is, the updating unit 112 updates and corrects an un-matched operation setting value Sd, which does not match the expected value E, to the expected value E.

The operation management apparatus 11 updates the un-matched operation setting value Sd to the expected value E in a forced manner, and thereby makes the system 10s normally operate. In this way, the operation management apparatus 11 automatically repairs the system 10s.

Next, details of the operation management apparatus according to the example embodiment will be described.

Figure 2:
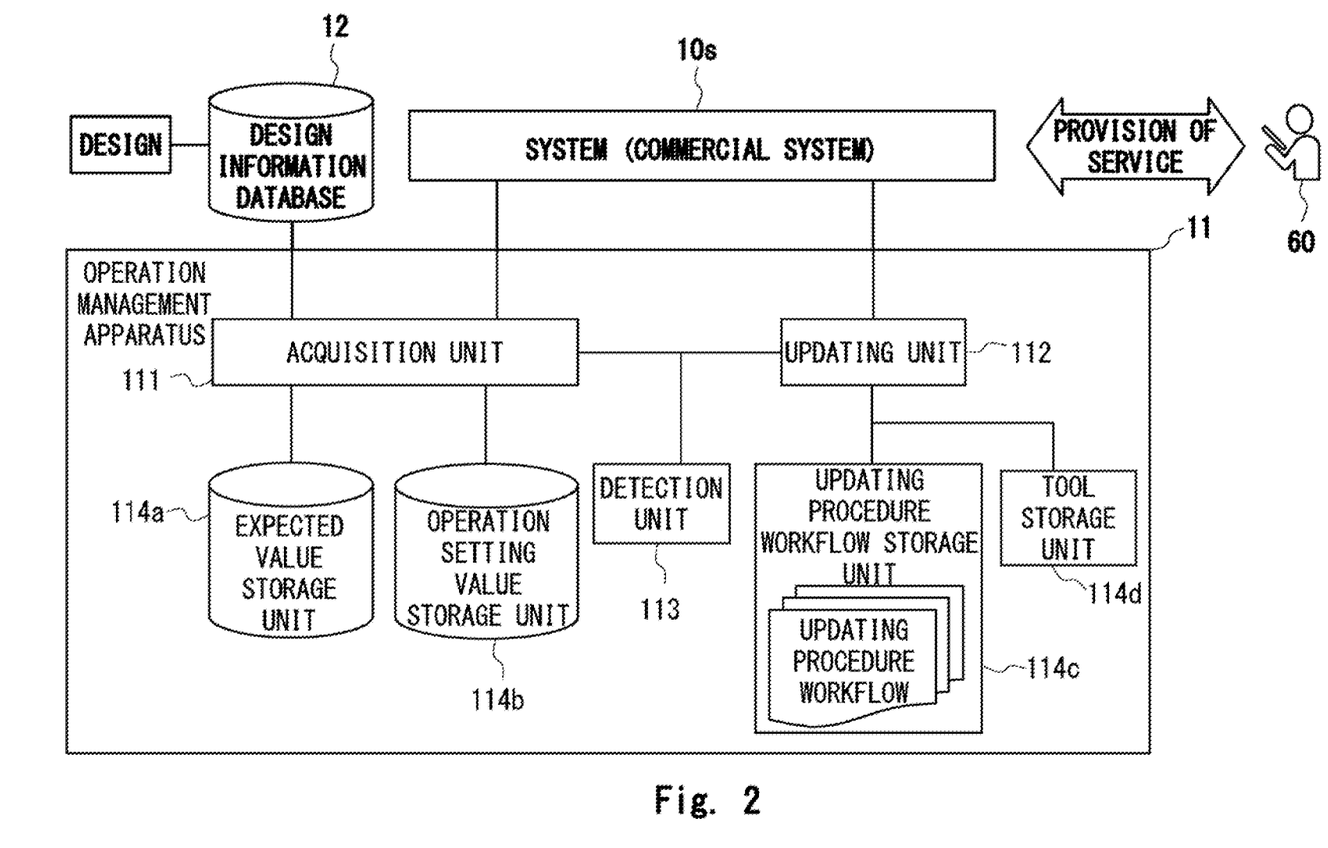
FIG. 2 is a block diagram showing an example of the operation management apparatus according to the example embodiment.

FIG. 2 is a block diagram showing an example of the operation management apparatus according to the example embodiment.

FIG. 2 is a block diagram drawn in a more detailed manner than FIG. 1.

As shown in FIG. 2, the operation management apparatus 11 further includes a detection unit 113, an expected-value storage unit 114a, an operation-setting-value storage unit 114b, an updating procedure workflow storage unit 114c, and a tool storage unit 114d.

Latest design information obtained from the design is stored in the design information database 12. The system 10s provides a service to a user 60.

The expected-value storage unit 114a stores an expected value E that the acquisition unit 111 has acquired from the design information database 12. The operation-setting-value storage unit 114b stores an operation setting value S of the system 10s that the acquisition unit 111 has acquired from the system 10s.

The detection unit 113 detects whether or not the expected value E that has been acquired by the acquisition unit 111 and stored in the expected-value storage unit 114a matches the operation setting value S that has been acquired by the acquisition unit 111 and stored in the operation-setting-value storage unit 114b.

The operation management apparatus 11 summarizes a plurality of tasks for updating the operation setting value S as an updating procedure workflow W. The updating procedure workflow storage unit 114c stores the operation setting value S and the updating procedure workflow W while associating them with each other. The updating procedure workflow may also be referred to as a repairing workflow or a recovering workflow. The task may also be referred to as a work.

The updating unit 112 searches for an updating procedure workflow Wd corresponding to the operation setting value Sd, which is an operation setting value when the operation setting value S does not match the expected value E, from the updating procedure workflow storage unit 114c. The updating unit 112 updates the operation setting value Sd, which is the operation setting value that does not match the expected value E, in accordance with the updating procedure workflow Wd obtained by the search.

After the un-matched operation setting value Sd was updated and corrected to the expected value E, if this updated and corrected operation setting value Sd is corrected again, it is considered that the system 10s has broken down. In such a case, the operation management apparatus 11 repeatedly updates the un-matched operation setting value Sd to the expected value E. Therefore, when the number of times of updating of the un-matched operation setting value Sd becomes equal to or larger than a predetermined number Nt, the operation management apparatus 11 may stop a part(s) of the system 10s that is related to the un-matched operation setting value Sd.

Next, operations performed by the operation management apparatus according to the example embodiment will be described. Specifically, operations that are performed from when the detection unit 113 of the operation management apparatus 11 compares the operation setting value S with the expected value E and, as a result, detects they do not match each other to when the un-matched operation setting value is automatically corrected will be described.

Figure 3:
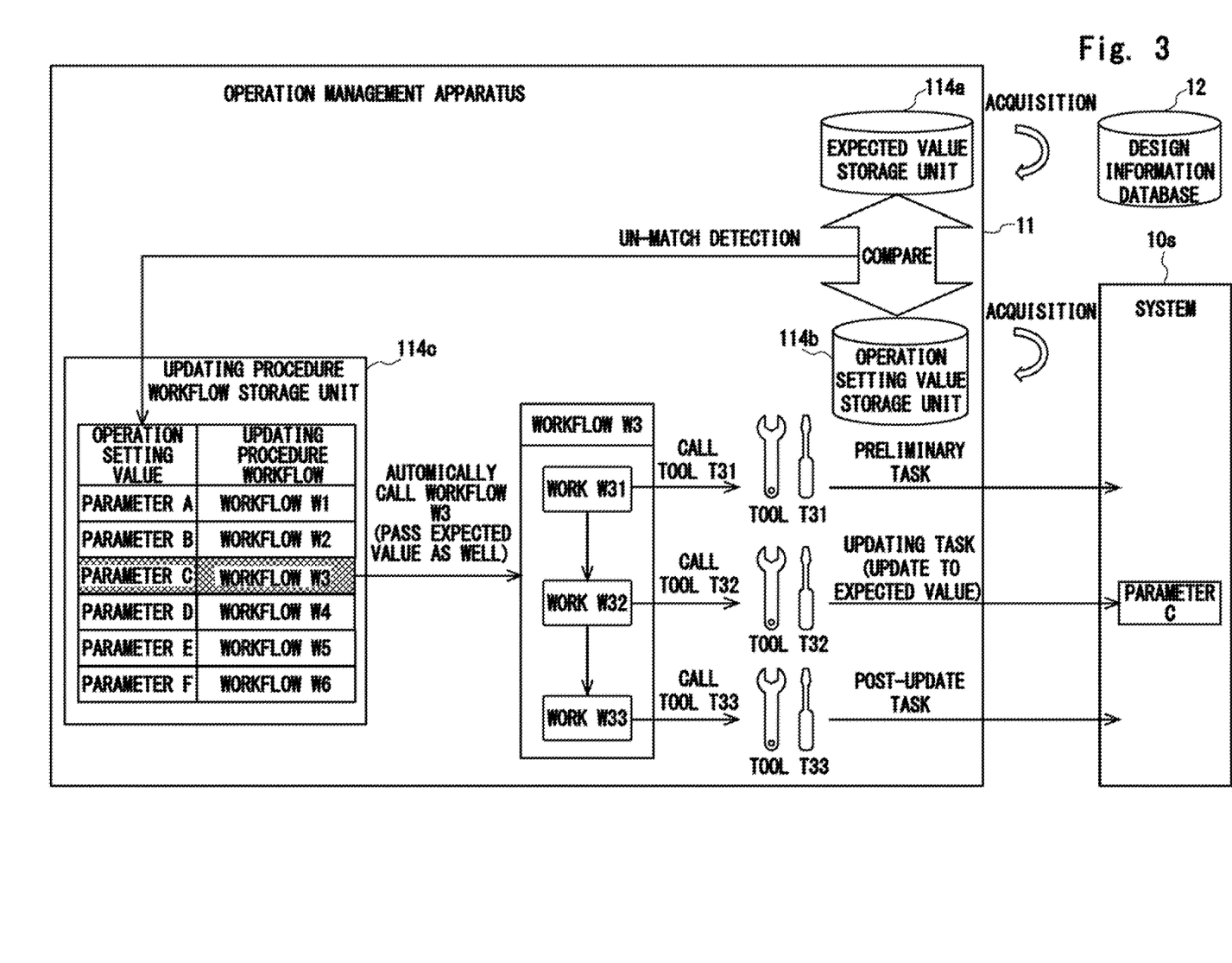
FIG. 3 is a block diagram showing an example of operations performed by the operation management apparatus according to the example embodiment.

FIG. 3 is a block diagram showing an example of operations performed by the operation management apparatus according to the example embodiment.

In FIG. 3, the updating procedure workflow is expressed as a workflow for the sake of simplicity.

An example case in which, among a plurality of operation setting values S, for example, a parameter C does not match its expected value E will be described.

As shown in FIG. 3, the operation management apparatus 11 compares the expected value E acquired from the design information database 12 with the operation setting value S acquired from the system 10s. As a result of the comparison, the operation management apparatus 11 detects the parameter C, which is the un-matched operation setting value Sd.

The operation management apparatus 11 searches for and calls (calls) an updating procedure workflow W3, which is an updating procedure workflow corresponding to the parameter C, from the updating procedure workflow storage unit 114c. At this point, the expected value E is passed to the updating procedure workflow W3.

The updating procedure workflow W3 includes, for example, a plurality of tasks including a work W31, a work W32, and a work W33. Each of the works W31, W32 and W33 is performed by using a tool unique to that work (task). For example, the work W31 is performed by using a tool T31, and the work W32 is performed by using a tool T32. Further, the work W33 is performed by using a tool T33. Therefore, the operation management apparatus 11 includes a tool storage unit 114d that stores a plurality of tools while associating them with their respective tasks.

The updating unit 112 of the operation management apparatus 11 searches for tools each of which corresponds to a respective one of the plurality of tasks included in the updating procedure workflow W from the tool storage unit 114d. For example, the updating unit 112 searches for and calls (calls), from the tool storage unit 114d, the tool T31 corresponding to the work W31 included in the updating procedure workflow W3, the tool T32 corresponding to the work W32 included therein, and the tool T33 corresponding to the work W33 included therein.

The updating unit 112 updates the operation setting value Sd, which is the parameter C, to the expected value E by using the retrieved tool T32.

The updating procedure workflow W3 includes an updating task for updating the operation setting value Sd to the expected value E, a preliminary task for preparing for the updating task, which is performed prior to the updating task, and an after-update task, which is performed after the updating task. In the example shown in FIG. 3, the updating task is a task performed by using the tool T32, and the preliminary task is a task performed by using the tool T31. Further, the after-update task is a task performed by using the tool T33.

When the operation setting value S of the system 10s does not match the expected value E, the operation management apparatus 11 updates the operation setting value to the expected value. In this way, by updating the operation setting value S of the system 10s to the expected value E, the system 10s can be automatically repaired.

As a result, it is possible to provide an operation management apparatus, a method, and a program capable of automatically correcting the operation setting value S of the system 10s.

Further, the use of the operation management apparatus 11 can make it possible to use a plurality of proper tools in the right place in an orderly manner. In this way, the system 10s can be efficiently repaired.

Comparative Example

Figure 4:
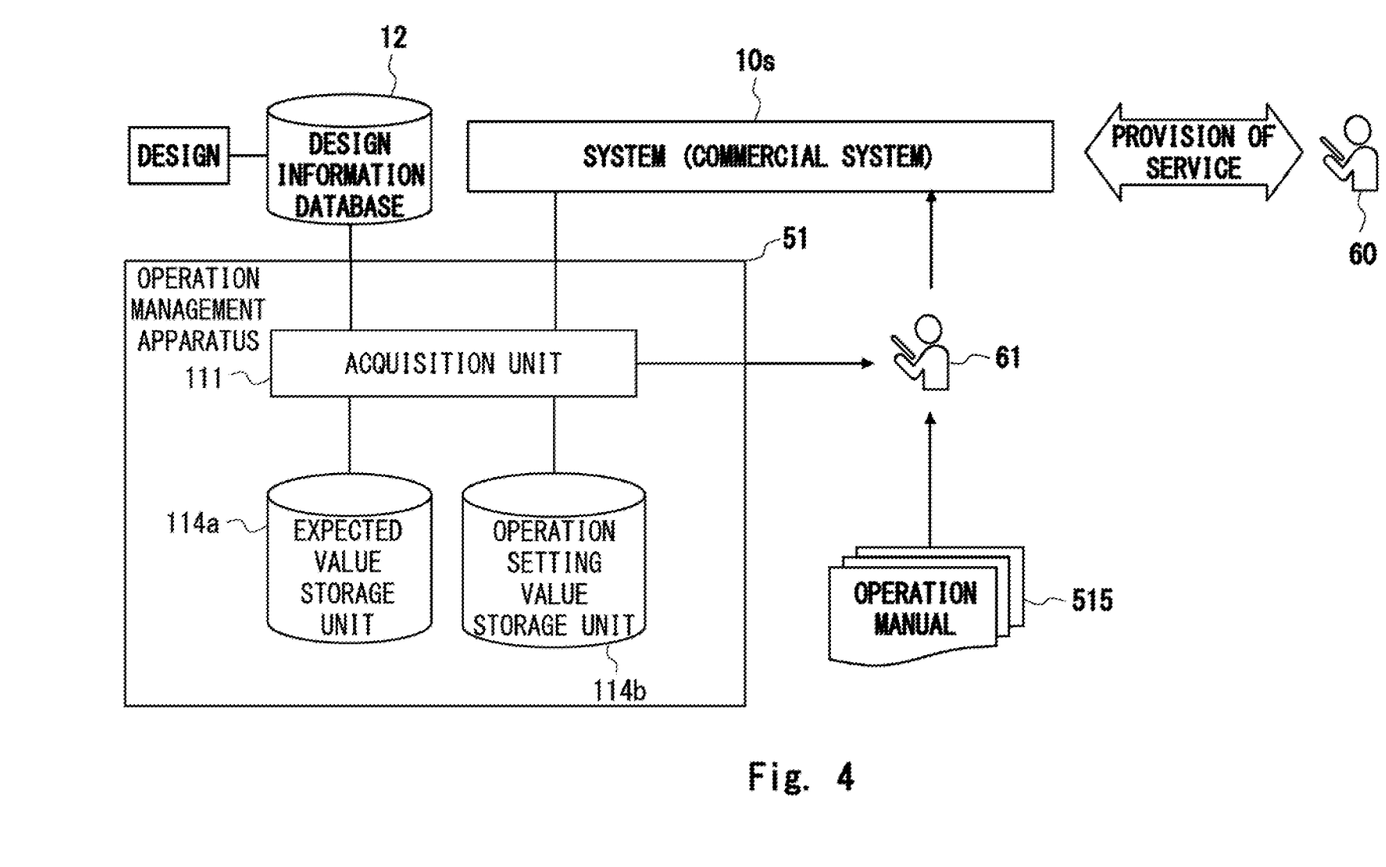
FIG. 4 is a block diagram showing an example of an operation management apparatus according to a comparative example of the example embodiment.

FIG. 4 is a block diagram showing an example of an operation management apparatus according to a comparative example of the example embodiment.

As shown in FIG. 4, as compared with the operation management apparatus 11 according to the example embodiment, an operation management apparatus 51 according to the comparative example does not include the updating unit 112.

Therefore, an operator 61 needs to check the result of the comparison between the operation setting value S and the expected value E and search the operation manual 515 in order to correct the un-matched operation setting value Sd to the expected value E. Further, the operator 61 needs to manually correct the un-matched operation setting value Sd to the expected value E.

As a result, in the case of the operation management apparatus 51, it is difficult to provide an operation management apparatus, a method, and a program capable of automatically correcting the operation setting value S of the system 10s.

Note that although the present invention is described as a hardware configuration in the above-described example embodiments, the present invention is not limited to the hardware configurations. In the present invention, the processes in each of the components can also be implemented by having a CPU (Central Processing Unit) execute a computer program.

In the above-described example embodiments, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Note that the invention is not limited to the above-described example embodiments and various changes may be made therein without departing from the spirit and scope of the present invention.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent applications No. 2018-067079, filed on Mar. 30, 2018, the disclosure of which is incorporated herein in its entirety by reference.

REFERENCE SIGNS LIST

10s SYSTEM
11, 51 OPERATION MANAGEMENT APPARATUS
111 ACQUISITION UNIT
112 UPDATING UNIT
113 DETECTION UNIT
114a EXPECTED VALUE STORAGE UNIT
114b OPERATION SETTING VALUE STORAGE UNIT
114c UPDATING PROCEDURE WORKFLOW STORAGE UNIT
114d TOOL STORAGE UNIT
12 DESIGN INFORMATION DATABASE
515 OPERATION MANUAL
60 USER
61 OPERATOR
C PARAMETER
S, Sd OPERATION SETTING VALUES
E EXPECTED VALUE
Nt PREDETERMINED NUMBER OF TIMES
W, W3, Wd UPDATE PROCEDURE WORKFLOW

W31, W32, W33 WORK
T31, T32, T33 TOOL

The invention claimed is:

1. An operation management apparatus comprising:
   at least one memory storing instructions, and
   at least one processor configured to execute the instructions to;
   acquire an operation setting value from a system, store the operation setting value in an operation-setting-value storage unit, acquire an expected value from a design information database storing design information of the system, the operation setting value being a setting value for operating the system, and the expected value being a setting value that is obtained when the system is operating as expected, and store the expected value in an expected-value storage unit;
   identify a plurality of tasks for updating the operation setting value as an updating procedure workflow;
   store the operation setting value and the updating procedure workflow while associating them with each other in an update procedure workflow storage unit; and
   detect whether or not the expected value stored in the expected-value storage unit match the operation setting value stored in the operation-setting-value storage unit, when there is a mismatch in which the operation setting value does not match the expected value, search, from among a plurality of updating procedure workflows, for the updating procedure workflow corresponding to the operation setting value in case of the mismatch, execute the updating procedure workflow obtained by the search, and update the operation setting value in case of the mismatch to the expected value,
   wherein the updating procedure workflow comprises an updating task for updating the operation setting value to the expected value and a preliminary task for preparing for the updating task, the preliminary task being a task that is performed prior to the updating task.

2. The operation management apparatus according to claim 1, wherein the at least one processor is further configured to store the expected value, and configured to store the operation setting value.

3. An operation management apparatus comprising:
   at least one memory storing instructions, wherein the memory includes an operation-setting-value storage unit, an expected-value storage unit, an update procedure workflow storage unit, and a tool storage unit, and
   at least one processor configured to execute the instructions to;
   acquire an operation setting value from a system, store the operation setting value in the operation-setting-value storage unit, acquire an expected value from a design information database storing design information of the system, the operation setting value being a setting value for operating the system, and the expected value being a setting value that is obtained when the system is operating as expected, and store the expected value in the expected-value storage unit;
   identify a plurality of tasks for updating the operation setting value as an updating procedure workflow;
   store the operation setting value and the updating procedure workflow while associating them with each other;
   store a plurality of tools while associating them with their respective tasks in the update procedure workflow storage unit;
   search the plurality of tools stored in the tool storage unit for tools which correspond to a respective one of the plurality of tasks included in the updating procedure workflow; and
   when there is a mismatch in which the operation setting value does not match the expected value, search for the tools corresponding to each of the plurality of tasks from among the plurality of tools, which are the plurality of tasks for updating the operation setting value in case of the mismatch, and execute the updating procedure workflow using the tools obtained by the search and update the operation setting value to the expected value,
   wherein each of the plurality of tasks for updating the operation setting value is performed by using a tool from among the plurality of tools corresponding to that task.

4. A method comprising:
   acquiring an operation setting value from a system, storing the operation setting value in an operation-setting-value storage unit, acquiring an expected value from a design information database storing design information of the system, the operation setting value being a setting value for operating the system, the expected value being a setting value that is obtained when the system is operating as expected, and storing the expected value in an expected-value storage unit;
   identifying a plurality of tasks for updating the operation setting value as an updating procedure workflow;
   storing the operation setting value and the updating procedure workflow while associating them with each other in an update procedure workflow storage unit;
   detecting whether or not the expected value stored in the expected-value storage unit match the operation setting value stored in the operation-setting-value storage unit; and
   executing, when there is a mismatch in which the operation setting value does not match the expected value, search, from among a plurality of updating procedure workflows, for the updating procedure workflow corresponding to the operation setting value in the case of the mismatch, the updating procedure workflow obtained by the search, and update the operation setting value to the expected value in case of the mismatch;
   wherein the updating procedure workflow comprises an updating task for updating the operation setting value to the expected value and a preliminary task for preparing for the updating task, the preliminary task being a task that is performed prior to the updating task.

5. A non-transitory computer readable medium storing a program for causing a computer to perform:
   acquire an operation setting value from a system, store the operation setting value in an operation-setting-value storage unit, acquire an expected value from a design information database storing design information of the system, the operation setting value being a setting value for operating the system, the expected value being a setting value that is obtained when the system is operating as expected, and store the expected value in an expected-value storage unit;
   identify a plurality of tasks for updating the operation setting value as an updating procedure workflow;
   store the operation setting value and the updating procedure workflow while associating them with each other in an update procedure workflow storage unit; and
   detect whether or not the expected value stored in the expected-value storage unit match the operation setting value stored in the operation-setting-value storage unit, execute, when there is a mismatch in which the operation setting value does not match the expected value, search, from among a plurality of updating procedure workflows, for the updating procedure workflow corresponding to the operation setting value in the case of the mismatch, the updating procedure workflow obtained by the search, and update the operation setting value in the case of the mismatch to the expected value, wherein the updating procedure workflow comprises an updating task for updating the operation setting value to the expected value and a preliminary task for preparing for the updating task, the preliminary task being a task that is performed prior to the updating task.

* * * * *